H. W. WERELEY.
LEAKPROOF JOINT.
APPLICATION FILED MAR. 25, 1919.
1,389,542.
Patented Aug. 30, 1921.
Fig. 1.
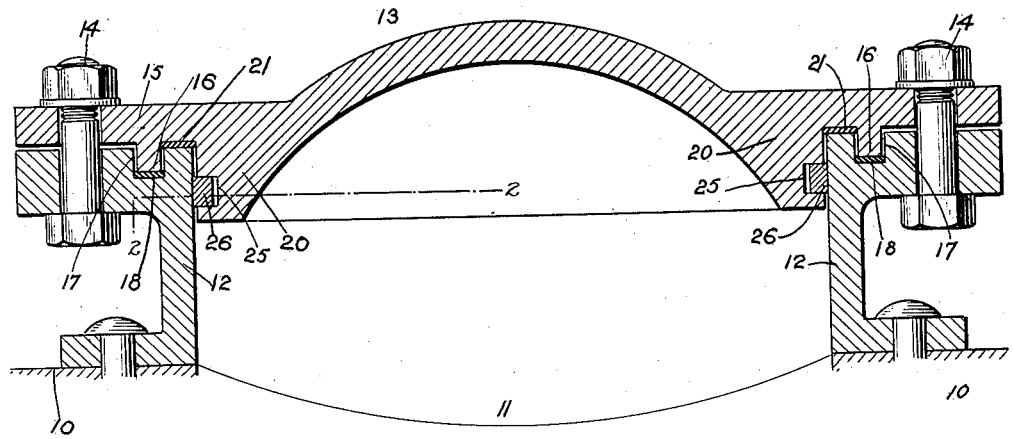
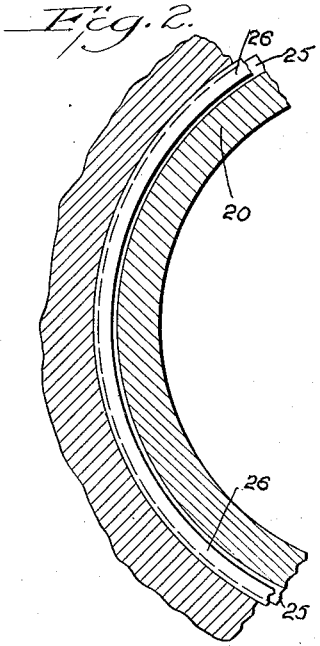
Fig. 2.
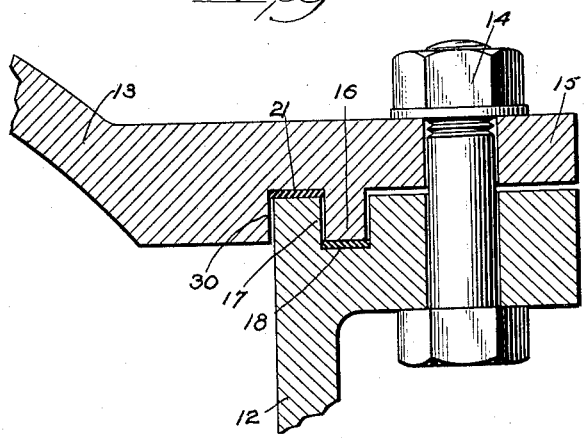
Fig. 3.
WITNESSES
INVENTOR
HILLIARD W. WERELEY
BY
ATTORNEYS

UNITED STATES PATENT OFFICE.

HILLIARD W. WERELEY, OF BAYONNE, NEW JERSEY.

LEAKPROOF JOINT.

1,389,542.  Specification of Letters Patent.  Patented Aug. 30, 1921.

Application filed March 25, 1919. Serial No. 284,973.

*To all whom it may concern:*

Be it known that I, HILLIARD W. WERELEY, a citizen of the United States, and a resident of Bayonne, in the county of Hudson and State of New Jersey, have invented a new and Improved Leakproof Joint, of which the following is a full, clear, and exact description.

The invention relates to manholes, covers, heads and similar parts of boilers, stills and other apparatus.

The object of the invention is to provide a new and improved leak-proof joint arranged to compensate for expansion and contraction due to variation in heat and pressure and without danger of leakage. Another object is to provide a leak-proof joint arranged to permit convenient assembling or disassembling of the parts of the joint.

With these and other objects in view the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 1 is a sectional side elevation of the improved leak-proof joint as applied at the manhole of a still;

Fig. 2 is a sectional plan view of the same on the line 2—2 of Fig. 1; and

Fig. 3 is an enlarged sectional side elevation of a modified form of the leak-proof joint.

As shown in Fig. 1, the boiler or still 10 is provided with an opening 11 surrounded by a bonnet 12 riveted or otherwise fastened in the usual manner to the boiler 10. A cover 13 closes the bonnet 12 and is fastened thereto by bolts 14. The cover 13 is provided with a flange 15 on the under side of which is formed an annular tongue 16 extending into an annular groove 17 formed in the top of the bonnet 12. A packing 18 of asbestos or other non-metallic material is arranged in the bottom of the groove 17 and is engaged by the tongue 16 to form a tight joint between the cover 13 and the bonnet 12.

The cover 13 is provided with an annular shoulder 20 fitting into the bonnet 12 and between this shoulder 20 and the tongue 16 is arranged a packing 21 resting on top of the bonnet 12 to provide a tight joint between the tongue 16 and the shoulder 20. The side of the shoulder 20 is provided with an annular groove 25 into which fits a metallic packing ring 26 bearing against the inner face of the bonnet 12 to thus provide a tight joint between the shoulder 20 and the bonnet 12.

From the foregoing it will be seen that by the arrangement described steam or vapors or gases under pressure and contained within the boiler are not liable to leak through the joint between the cover 13 and the bonnet 12. It is understood that when the bolts 14 are tightened, the tongue 16 is drawn in firm contact with the packing 18, and the packing 21 is drawn tight between the top of the bonnet 12 and the under side of the cover 13. In addition to this double packing the metallic packing 26 provides a tight joint between the shoulder 20 and the bonnet 12 to render it practically impossible for any vapors to leak out between the bonnet and the cover. In some cases the metallic packing 26 can be dispensed with, as illustrated in Fig. 3, it being understood that in this case the annular shoulder 30 on the cover 13 is shortened but otherwise the construction is the same as above described and consequently further description of the leak-proof joint is not deemed necessary.

It will be noticed that by the arrangement described the cover 13 can be readily removed from the bonnet 12 and replaced whenever it is desired to do so and without interference from the members of the leak-proof joint, as above explained.

Having thus described my invention, I claim as new and desire to secure by Letters Patent:—

In a leak-proof joint, two joint members detachably connected with each other, one of the said members having an annular shoulder and an annular tongue, the said shoulder fitting into the other member and the latter having an annular groove into which extends the said tongue, a non-metallic packing on the bottom of the said groove and engaged by the end of said tongue, a packing interposed between the said members intermediate the said shoulder and the said tongue, the said shoulder being provided with an annular groove, and a resilient metallic packing ring in the said shoulder groove and bearing against the inner face of the other joint member.

HILLIARD W. WERELEY.